Figure 1:
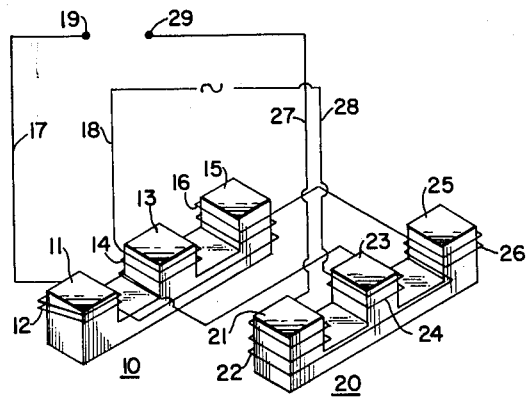

April 17, 1962   J. F. SCHUGT   3,030,533
POSITION TRANSDUCER
Filed Aug. 24, 1959

INVENTOR
JOSEPH F. SCHUGT
BY *Vernon A. Johnson*
ATTORNEY 3,030,533
POSITION TRANSDUCER
Joseph F. Schugt, Minneapolis, Minn., assignor to Minneapolis-Honeywell Regulator Company, Minneapolis, Minn., a corporation of Delaware
Filed Aug. 24, 1959, Ser. No. 835,777
10 Claims. (Cl. 310—168)

My invention relates generally to electromechanical transducers, and more particularly to transducers wherein an electrical signal is generated that is proportional to the displacement between relatively movable elements.

The conventional three-legged transformer-type pickoff, which is often referred to as an E pickoff, is a well-known device for providing an electrical signal proportional to the relative displacement between two relatively movable elements. The E-shaped stator of the device is provided with an energizing coil around the center leg of the E, and the flux thereby generated is normally divided so as to flow equally through the outer legs of the stator. Windings are placed on the outer two legs of the stator and these windings are connected in series so that the signals generated therein responsive to the magnetic flux in the stator, oppose each other. Thus, when the flux in the outer legs is equal, equal and opposite signals are generated which cancel each other, providing a net zero output. An armature of magnetically permeable material is arranged in close proximity to the ends of said three stator legs, and is normally positioned so as to provide equal air gaps between the center leg and each of the outer legs. However, when there is relative movement between the stator and this armature, the shape of the armature is such that a differential change in these air gaps occurs. This causes signals of different magnitudes to be generated in the above mentioned pickoff windings due to the relative change in the reluctance of the magnetic paths, and a resultant net signal is generated equal to the difference between these individual signals and having a phase and magnitude generally corresponding to the direction and magnitude of displacement, respectively.

These transformer-type pickoffs are well known in the art, and have been used to detect linear and angular displacement, but have been generally limited to fairly small overall displacements. Furthermore, such devices are generally subject to inaccuracies caused by slight undesirable armature displacements in a direction transverse to the intended direction of displacement, since the prior art devices of this type have been unable to discern between these two types of movements.

I overcome these limitations of the prior art by providing pickoff means for sensing both linear and angular movements, wherein the pickoff means is insensitive to armature movement in a direction transverse to the intended direction of movement; and by providing pickoff means for generating a useful output signal for angular deviations through a full 360°.

Thus, it is a primary object of my invention to provide an improved electromechanical transducer, employing E pickoff-type transformers, that is sensitive to armature displacement in one direction between relatively movable elements, and insensitive to transverse armature movement.

A further object of my invention is to provide such an improved eletcromechanical transducer wherein a useful output signal is generated for a full 360° angular movement.

Figure 3:
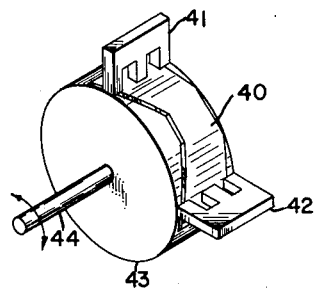
Figure 2:
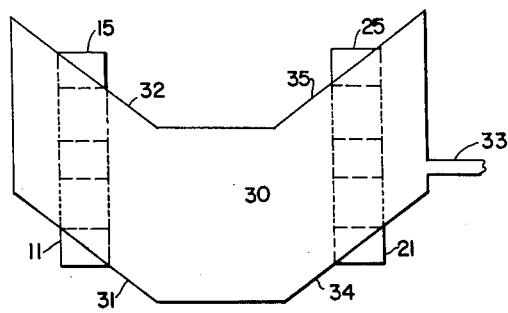
Figure 4:
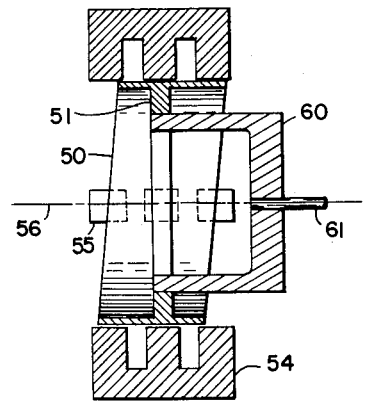
Figure 5:
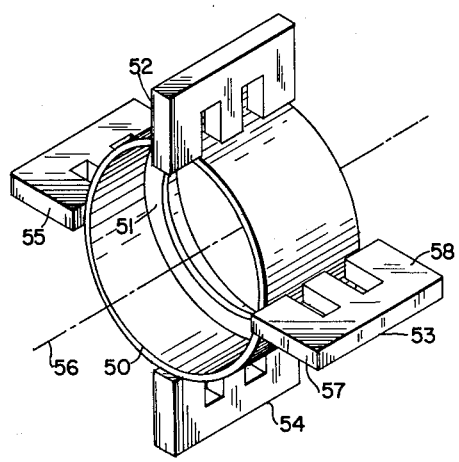

These and other objects of my invention will become apparent from the following description of a preferred form thereof and the single sheet of drawings illustrating that form, in which:

FIGURE 1 is an isometric view of a pair of E-shaped stator members as used in my invention;
FIGURE 2 is a top view of the E-shaped stator members shown in FIGURE 1, with a shaped armature member positioned thereover for linear movement;
FIGURE 3 is an isometric view of a pickoff arrangement similar to that shown in FIGURE 2, but arranged for detection of wide angular movements;
FIGURE 4 is a cross sectional view of a pickoff device for detecting 360° of angular movement; and
FIGURE 5 is an isometric view of the device shown in FIGURE 4.

In FIGURE 1, I have shown a pair of E-shaped stator members, wired in the manner used throughout my invention. Although I have not shown the energizing and pickoff windings in the other figures, it should be understood that each pair of E-shaped stators (10—20, 41—42, 52—54, and 53—55) are wired in the manner shown in FIGURE 1. Stator 10 is provided with three legs 11, 13 and 15, with windings 12, 14 and 16, respectively, wound thereon. Stator 20 includes legs 21, 23 and 25, windings 22, 24 and 26, respectively, being wound thereon. The energizing circuit for center legs 13 and 23 includes a source of alternating current, lead 18, coil 14, coil 24 and lead 28. It should be noted that coils 14 and 24 are wound counterclockwise and clockwise, respectively, so that the direction of flux flow is opposite in these two center legs. For example, when the polarity of the alternating signal is such as to cause flow of flux out of leg 13 and into legs 11 and 15 in stator 10, the same energizing circuit causes flux to flow into leg 23 and out of legs 21 and 25 in stator 20.

The output circuit of FIGURE 1 includes all four of the outer legs of the stators, and extends from terminal 19 to lead 17, through coils 12, 16, 26 and 22, and over lead 27 to terminal 29. The output signal from this circuit is impressed across terminals 19 and 29, and varies in phase and magnitude in proportion to the direction and magnitude of armature displacement, and will be described more clearly below. As viewed in the drawing, it will be noted that with reference to output terminal 19, coil 12 is wound clockwise on leg 11, coil 16 is wound counter-clockwise on leg 15, coil 26 is wound counter-clockwise on leg 25, and coil 22 is wound clockwise on leg 21. This winding configuration provides the necessary flux relationship to provide a usable output signal while rendering my device insensitive to transverse movement, or end-play, of the armature.

The operation of my device will be best understood in FIGURE 2, and by reference to FIGURE 1 in connection therewith, within armature 30 is shown in the neutral position above stators 10 and 20, and so as to cover one-half of the end of legs 11, 15, 21 and 25. An arm 33 is integrally formed with armature 30, and is used to provide a relative movement between armature 30 and stators 10 and 20. Stators 10 and 20 are securely mounted so as to be fixed in space with relation to each other by suitable mounting means (not shown) whereas armature 30 is intended for movement back-and-forth over the two stators, the movement of armature 30 being controlled by forces directed along the length of arm 33 so as to impart motion to the armature. It should be noted that when armature 30 is moved to the right, edge 31 thereof is moved so as to expose a greater portion of leg 11, edge 32 is moved so as to cover a greater portion of leg 15, edge 35 is moved so as to expose a greater portion of leg 25, and edge 34 is moved so as to cover a greater portion of leg 21. Furthermore, movement of armature 30 to the left causes a greater portion of legs 15 and 21 to be exposed, and a greater portion of legs 11 and 25 to be covered.

The operation of my pickoff assembly is as follows: In order for the flux to be flowing out of leg 13 at any particular time, and into leg 23, as described above, it is apparent, by application of the well-known right-hand rule for determining the direction of flux movement for corresponding flow of current, that energizing current is flowing from the alternating current source, through lead 18, through primary windings 14 and 24, and back on lead 28 to the alternating current source. By application of other well-known principles of electromagnetism, it is apparent that the alternating current source causes continuous change in the current flowing in primary winding 14, thereby causing continuous change in the magnetic flux linking secondary windings 12 and 16. This change in magnetic flux causes an E.M.F. to be induced in secondary winding 12, and an E.M.F. of opposite polarity to be induced in winding 16. For example, if the alternating source is causing lead 18 to become more positive, secondary winding 12 generates a potential tending to drive terminal 19 more negative and terminal 29 more positive; and secondary winding 16 generates a potential tending to drive terminal 19 more positive and terminal 29 more negative. With armature 30 located in the center position as shown in FIGURE 2, these two voltages are equal in magnitude, and they therefore cancel each other so as to cause a net zero output across terminals 19 and 29. In a similar manner, secondary windings 22 and 26 of stator 20 have equal and opposite voltages induced therein when the armature is located in the neutral position as shown in FIGURE 2. With reference to the above example whereby lead 18 is going more positive, winding 22 provides a voltage tending to drive terminal 19 more positive, and winding 26 provides a voltage tending to drive terminal 19 more negative. Since these voltages are normaly equal, they cancel and provide a net zero voltage at output terminals 19 and 29. It is apparent that each secondary-winding induced voltage would be reversed in polarity, as compared with the above example, when lead 18 is being driven less positive (more negative), but the induced voltages would still cancel as long as armature 30 is centered as shown in FIGURE 2.

When armature 30 is moved to the right or left, an output voltage is established across output terminals 19 and 29, with a magnitude proportional to the armature displacement. The phase of this output voltage is determined by the direction of armature movement, the signal for leftward movements being 180° out of phase with the signal for rightward movement. In order to clarify this signal producing operation, a condition will be described wherein the armature has been moved to the right, and lead 18 is going more positive. It is apparent that the reluctance of the various magnetic paths has been changed by this movement, so as to cause a greater amount of flux to flow through legs 15 and 21, and a lesser amount of flux to flow through legs 11 and 25. This causes a corresponding change in the magnitude of the voltage induced in the corresponding secondary windings, said magnitude being inversely related to the reluctance of the corresponding magnetic path. Thus, the voltage induced in coil 16 is greater than the voltage in coil 12, and the voltage induced in coil 22 is greater than that in coil 26. It should be noted that the effect of coils 16 and 22 is additive, both tending to drive terminal 19 more positive, thus providing an output signal. It is apparent that at a point of the time one-half cycle later than the conditions assumed (lead 18 going negative), all of the flux directions and secondary winding voltage polarities would be reversed.

A similar analysis could be made for movement of armature 30 to the left, and it is apparent that the output signal at terminals 19 and 29 would then be reversed in phase as compared with the signals developed for movements to the right as just described.

In FIGURE 3, I have shown a position transducer similar to that of FIGURE 2, but arranged about a rotating drum to achieve signals proportional to angular displacement, rather than linear displacement. Stators 41 and 42 correspond to stators 10 and 20, respectively, and armature 40 corresponds to armature 30, but is contoured to be securely attached about the outer edge of non-magnetic drum 43, as shown. Thus, when a rotational movement is imparted to shaft 44, to rotate drum 43, stators 41 and 42 produce an output signal proportional to the magnitude of the angular movement.

It should be noted in FIGURES 2 and 3, that my transducer is insensitive to displacements in a direction transverse to the desired direction of displacement, i.e. movements tranverse to arm 33 in FIGURE 2, and axial movements in FIGURE 3. This results from the novel winding arrangement used in connection with the transducer, which will be understood more clearly from the arrangement shown in FIGURES 1 and 2. I will again assume that flux is flowing out of leg 13 and into leg 23 due to the excitation signal at the particular instant of time to be considered. The directions of flux and current are then the same as those described above in connection with the basic explanation of FIGURE 2. With armature 30 in the neutral position as shown, the net output signal at terminals 19 and 29 is zero as described above. However, in the event that an undesirable transverse force is applied to armature 30, so as to move armature 30 toward the top of the sheet of drawings, it is desirable to maintain a zero output even though a greater proportion of legs 11 and 21 becomes exposed, and a greater proportion of legs 15 and 25 becomes covered, by the movement of armature 30. This is accomplished by the winding configuration that I have used. For the conditions assumed, and again assuming that lead 18 is going more positive, it should be noted that the magnitude of the voltage across coil 12 is decreased, the magnitude of voltage across coil 16 is increased, the magnitude of voltage across coil 26 is increased, and the magnitude of voltage across coil 22 is decreased, due to the redistribution of flux caused by the armature movement. Thus, there is a net positive voltage at terminal 19 due to stator 10 and winding 16 thereof, and a net negative voltage at terminal 19 due to stator 20 and winding 26 thereof. It should be noted, however, that these signals are equal and opposite due to the symmetry of the components of my transducer. Thus, they cancel and prevent any output voltage across terminals 19 and 29 due to the transverse, or end-play, movements of armature 30. Similarly, axial movements of drum 43 in FIGURE 3 would cause a net zero output from the coils on stators 41 and 42.

Each of the above examples has been based on the winding configuration shown in FIGURE 1, wherein the energization of the primary windings 14 and 24 causes flux to flow out of one center leg and into the other. It should be understood, however, that my tranducer will work equally well with different winding configurations. For example, winding 24 could be reverse-wound so that flux would flow simultaneously out of or into the two center legs 13 and 23 of stators 10 and 20, respectively. Then, by connecting the output circuit to extend from terminal 19, over lead 18, through coils 12, 16, 22 and 26, and then back on lead 27 to terminal 29, my transducer would operate in much the same manner as described above. Other winding configurations for accomplishing the purposes of my invention will suggest themselves to those skilled in the art.

In FIGURES 4 and 5, I have shown a position transducer for generating sine and cosine signals responsive to rotation of a drum through any angular displacement, and which will continue to generate such signals responsive to continuous rotation of the drum in one direction or the other. I have accomplished this by using two pairs of stators, as described in FIGURE 1, the four stators being located at 90° intervals about the face of the drum, and fixed in space and with relation to each other and the drum by suitable mounting means (not shown). The stators in each pair of stators are located diametrically opposite each other as shown. The shape of the drum will be best understood in FIGURE 4, wherein it is apparent that the drum is in the form of an internally flanged length of tubing having its ends cut parallel but at an angle slightly removed from being perpendicular to the axis of the tube.

More specifically, drum 50, which is provided with an internal flange 51, is positioned to rotate about axis 56 by shaft 61 and member 60 (not shown in FIGURE 5), which could conveniently be an extension of the gimbal of a gyroscope. One pair of stators, 52—54, are wired as shown in FIGURE 1, and positioned at diametrically opposite points at the outside of drum 50 as shown in FIGURES 4 and 5. The other pair of stators 53—55, are also positioned diametrically opposite each other. These four stators define four 90° angular segments about the perimeter of said drum 50. It is apparent that with the drum positioned as shown with respect to the four stators, stators 53 and 55 do not provide an output signal since armature 50 is located at the neutral position similar to that of FIGURE 2, and the output signal from each stator is zero. However, when the drum rotates, a greater proportion of the leg 57 is covered by drum 50, and a lesser proportion of leg 58 is covered by the drum, resulting in a net output signal from the stator 53 that approaches a maximum as the drum rotates through 90 angular degrees. Continued rotation of the drum 50 causes the output signal from stator 53 to return to zero as the drum rotated through an additional 90°, followed by the development of a signal of opposite polarity as the drum rotates through an additional 90°, and thereafter returns to zero as the drum rotates through another 90° and returns to the position shown. Thus, a sine wave signal is generated, from stator 53, which is series summed with a similar signal generated in stator 55, to thereby produce a symmetrical sine wave having a magnitude equal to twice the magnitude of the signal generated in either of the two stators 53—55. Similarly, a signal is generated in stators 52 and 54 that is 90 electrical degrees removed in time from the signal generated in stators 53 and 55, thereby providing a symmetrically cosine wave. This is apparent from the fact that the drum, as shown, is positioned to cause maximum signal output from stators 52 and 53 at the beginning of the rotational cycle.

Thus, it is apparent that a configuration of FIGURE 4 and FIGURE 5 can be used to generate accurate sine and cosine signals, responsive to rotation of drum 50 in a very inexpensive and simple configuration that does not require conventional slip rings. It should further be noted that the combined sine and cosine signals from two diametrically opposite stators is insensitive to axial movement of drum 50, due to the arrangement of windings on the various stators. The change in signal due to end play is cancelled by the arrangement of windings in the manner described in connection with FIGURE 2 above.

Although I have shown only one set of four stators to provide sine-cosine signals in FIGURES 4 and 5, it is apparent that one or more additional sets of four stators could be symmetrically located about the drum in the same plane as stators 52, 53, 54 and 55. This would make it possible to derive a plurality of sine-cosine signals in a very compact and inexpensive configuration. In this connection, it should be noted that the sine-type signals from adjacent stators are spaced apart by a number of electrical degrees equal to the angular degrees of displacement.

What has been described is considered to be the preferred embodiment of my invention, but it should be understood that various changes and modifications thereof may be made without departing from the spirit or scope of the invention as defined in the appended claims.

What is claimed is:

1. A pickoff device for generating a signal responsive to relative displacement between relatively movable objects, comprising: a pair of three-legged stators mounted in relatively fixed relation; an energizing circuit including energizing windings on the center leg of each stator, said energizing windings being effective when energized to cause a flow of flux in a plurality of magnetic paths, each flux path including a center leg and one of the outer legs of said stators; an output circuit including output windings on each outside leg of said stator, each of said output windings being effective to produce a signal induced therein by said flow of flux; and a magnetic armature movably mounted adjacent said stator legs, so as to define an air-gap at each of said legs, said armature being arranged to form a part of each said magnetic path and shaped to cause a change of flux distribution in said paths when moved in one direction whereby to change the signal from said output circuit, and to cause a change of flux distribution in said paths when moved transverse to said one direction in a manner to have no effect on said output circuit signal.

2. A pickoff device for generating a signal responsive to relative displacement between relatively movable objects, comprising: a pair of three-legged stators mounted in relatively fixed relation; a generally chevron-shaped magnetic armature movably mounted adjacent said stator legs so as to define an air gap at each of said legs, the width of said armature being such that the projection thereof perpendicular to the end of said legs covers the center legs and partially covers the outside legs of said stators; a plurality of windings individually placed on said legs; energizing circuit means connecting the windings on said center legs in series relation, and effective when energized to cause a flow of flux in a plurality of magnetic paths, each of said paths including said armature, a stator center leg, one of the stator outer legs, and the respective air gaps therebetween, movement of said armature being effective to change the flux distribution in said paths due to a relative change in said air gaps; and output circuit means connecting the other windings in series relation, wherein each of said other windings receives an induced signal having a magnitude inversely related to the reluctance of the corresponding magnetic path, said other windings connected to provide a total signal in said output circuit that changes as said armature is moved in one direction, while remaining unaffected by armature movements transverse to said one direction.

3. A pickoff device for generating a signal responsive to relative displacement between relatively movable objects as claimed in claim 2, wherein said armature is arcuately arranged about a rotatable shaft, and said stators are arranged along radii of said shaft, rotation thereof being said one direction of movement, and axial movement thereof being said transverse movement.

4. A pickoff device for generating a signal responsive to relative displacement between relatively movable objects, comprising: an E-shaped three-legged stator radially positioned with respect to an axis of rotation and lengthwise along said axis with the legs thereof positioned towards said axis; a rotatable armature mounted for rotation on said axis so as to define an air gap at each of said legs, said armature having an axial length less than the length of said stator, and the ends thereof being located in spaced-apart parallel planes that are slightly removed from being perpendicular to said axis; a plurality of windings individually placed on said stator legs; means for individually energizing the center-leg winding to thereby cause a flux flow through a pair of magnetic circuits, each including said center leg, one of said outer legs, said armature, and the respective air gaps therebetween; and an output circuit including the windings on the outer two legs connected to produce a sine-typed output signal as said armature is continuously rotated.

5. A pickoff device for generating a signal responsive to relative displacement between relatively movable objects, comprising: a rotatable armature mounted for rotation on a center axis, the ends thereof being located in spaced-apart parallel planes that are slightly removed from being perpendicular to said axis; a pair of E-shaped three-legged stators diametrically located about said armature and lengthwise along said axis, with the legs thereof positioned toward said armature and so as to define an air gap at each of said legs, said stators being longer than the axial length of said armature and the ends thereof being positioned in spaced-apart parallel planes perpendicular to said axis; a plurality of windings individually placed on said stator legs; means for energizing the windings on the center legs of said stators to thereby cause a flux flow through a plurality of magnetic paths, each path including one of said stator center legs, an adjacent stator outer leg, said armature, and the respective air gaps therebetween; individual output circuits including the windings on the outer two legs of each stator, connected to produce a sine-typed output signal from each of said stators as said armature is continuously rotated; and circuit means for combining said individual outputs to produce a total signal having a magnitude equal to twice the individual outputs and independent of axial movement of said armature.

6. A pickoff device for generating a signal responsive to relative displacement between relatively movable objects, comprising: a plurality of E-shaped three-legged stators radially located about an axis of rotation and lengthwise along said axis, with the legs thereof positioned towards said axis and the ends thereof positioned in spaced-apart parallel planes perpendicular to said axis; a rotatable armature mounted for rotation along said axis so as to define an air gap at each of said legs, said armature having an axial length less than the length of each stator and the ends thereof being located in spaced apart parallel planes that are slightly removed from said perpendicular; a plurality of windings individually placed on said stator legs; means for energizing the windings on the center legs of said stators to thereby cause flux flow through a plurality of magnetic paths, each path including one of said stator center legs, an adjacent stator outer leg, said armature, and the respective air gaps therebetween; and a plurality of individual output circuits including the windings on the outer two legs of each stator, connected to produce a sine-type output signal from each stator as said armature is continuously rotated, the electrical displacement between the signals from any two stators being displaced by a number of electrical degrees corresponding to the number of angular degrees displacement between said two stators.

7. A pickoff device for generating a signal responsive to relative displacement between relatively movable objects as claimed in claim 6, additionally comprising: circuit means for connecting the individual output circuits of diametrically opposite stators in series relation so as to produce a plurality of combined output signals having magnitudes equal to the sum of the individual output signals and independent of axial movement of said armature.

8. A pickoff device for generating a signal responsive to relative displacement between relatively movable objects, comprising: a multi-legged stator circumferentially positioned with respect to an axis of rotation with the legs thereof positioned towards said axis; a rotatable armature mounted for rotation on said axis so as to define an air gap at each of said legs, said armature having an axial length less than the axial length of said stator, and the ends thereof being located in spaced-apart planes one of which is slightly removed from being perpendicular to said axis; a plurality of windings placed on said stator legs; means of energizing a portion of said windings to thereby cause a flux flow through a plurality of magnetic circuits, each including an adjacent pair of said stator legs, said armature, and the respective air gaps therebetween; and at least one output circuit including the remaining portion of said windings connected to produce a sine-type output signal as said armature is continuously rotated.

9. An inductive pickoff for generating a signal indicative of relative displacement between relatively movable objects comprising: a stator of magnetic material having a plurality of legs extending towards an axis of rotation; an armature of magnetic material mounted for rotation about said axis and positioned with respect to said stator so as to define an air gap between it and each of said legs, said armature having an axial end thereof lying in a plane which is tilted from a plane perpendicular to said axis; and winding means on said stator adapted when energized to cause magnetic flux to flow in a magnetic circuit including said stator and said armature.

10. An inductive pickoff for generating a signal indicative of relative displacement between relatively movable objects comprising: a stator of magnetic material having a plurality of legs extending towards an axis of rotation; an armature of magnetic material mounted for rotation about said axis and positioned with respect to said stator so as to define an air gap between it and each of said legs, said armature having an axial end thereof lying in a plane which is tilted from a plane perpendicular to said axis; means adapted to cause magnetic flux to flow in a magnetic circuit including said stator and said armature; and output winding means on said stator adapted to be linked by said magnetic flux.

References Cited in the file of this patent

UNITED STATES PATENTS

| | | |
|---|---|---|
| 1,823,217 | Sparkes | Sept. 15, 1931 |
| 2,401,175 | Morrill | May 28, 1946 |
| 2,662,301 | Beach | Dec. 15, 1953 |
| 2,730,664 | Karlson | Jan. 10, 1956 |